(No Model.) 10 Sheets—Sheet 1.
H. STÖCKEL.
EMBROIDERING MACHINE.
No. 332,846. Patented Dec. 22, 1885.
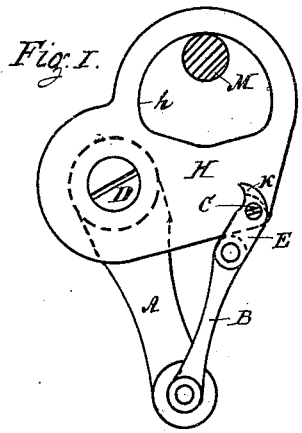
Fig. I.
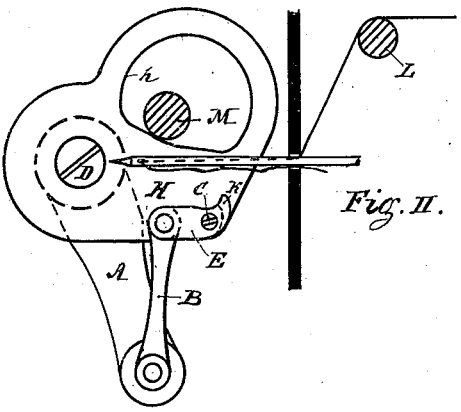
Fig. II.
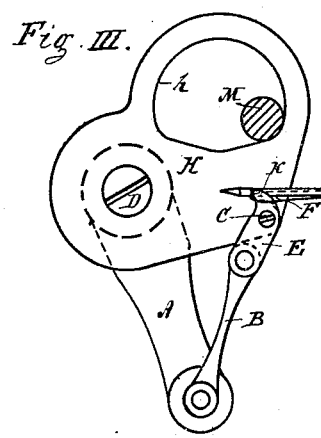
Fig. III. Fig. III.ˣ
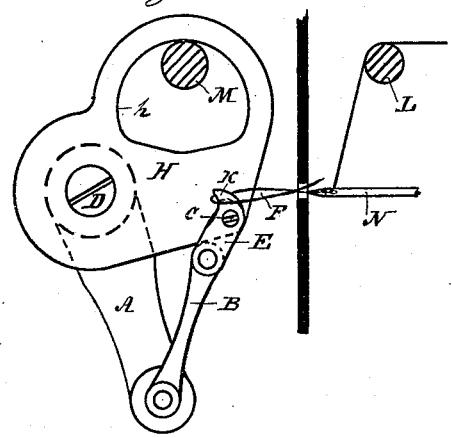
Fig. IV.
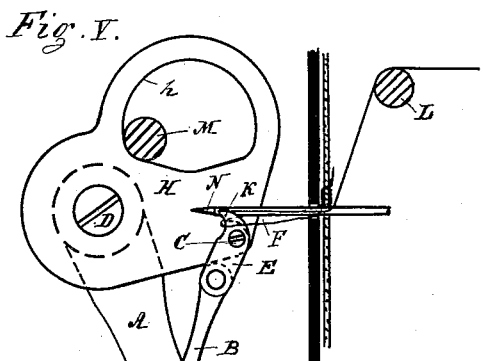
Fig. V.
Witnesses
Oscar Berger
S. Lowenthal
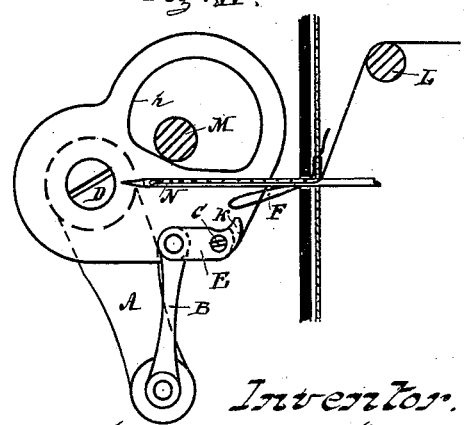
Fig. VI.
Inventor
Hermann Stöckel
per Henry E. Roeder
Attorney

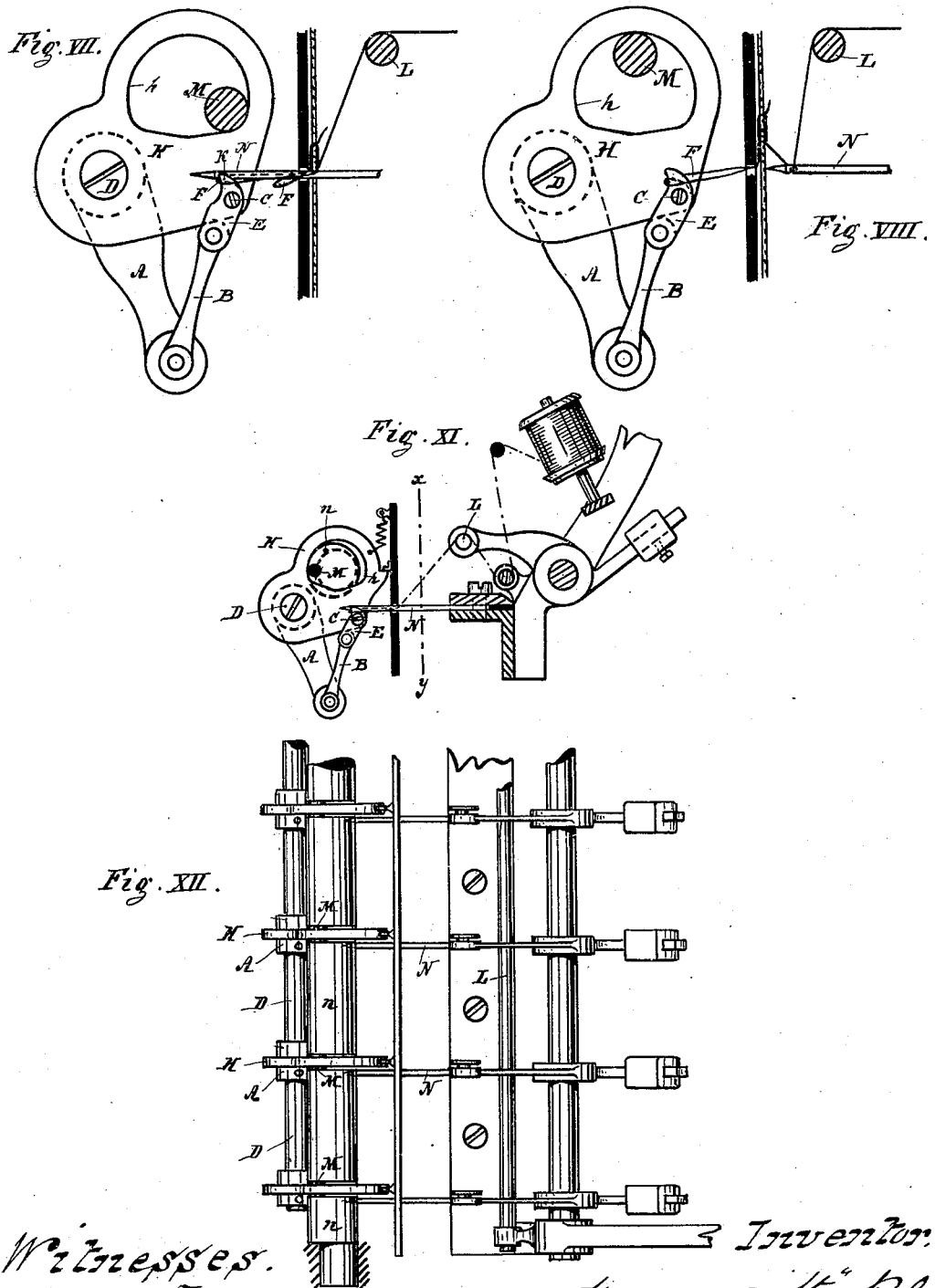

(No Model.) 10 Sheets—Sheet 3.
H. STÖCKEL.
EMBROIDERING MACHINE.
No. 332,846. Patented Dec. 22, 1885.
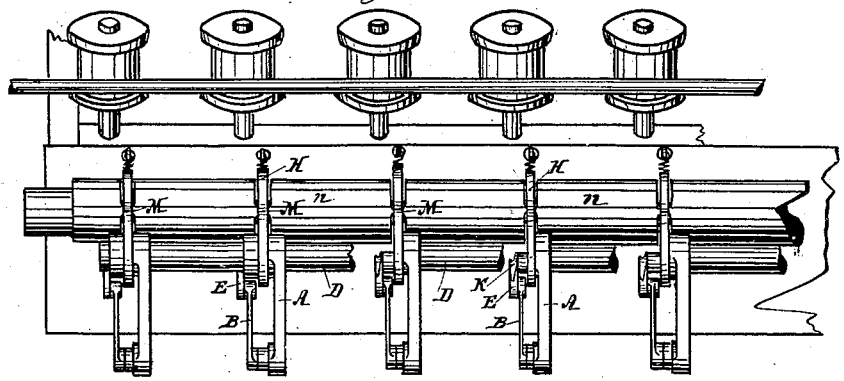
Fig. XIII.
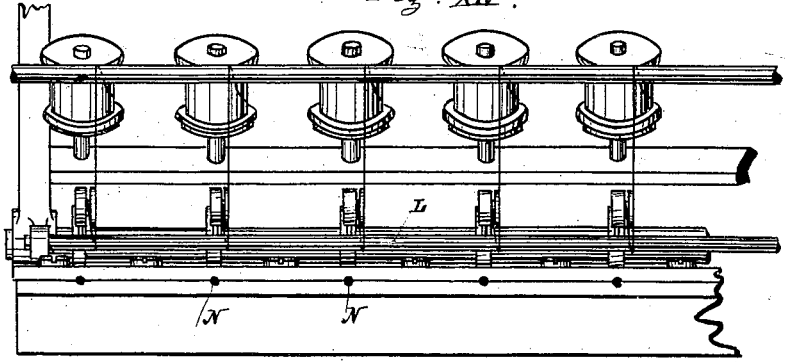
Fig. XIV.
Fig. IX.
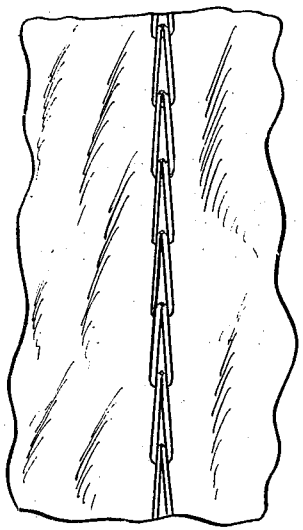
Fig. X.

(No Model.) 10 Sheets—Sheet 4.
H. STÖCKEL.
EMBROIDERING MACHINE.
No. 332,846. Patented Dec. 22, 1885.
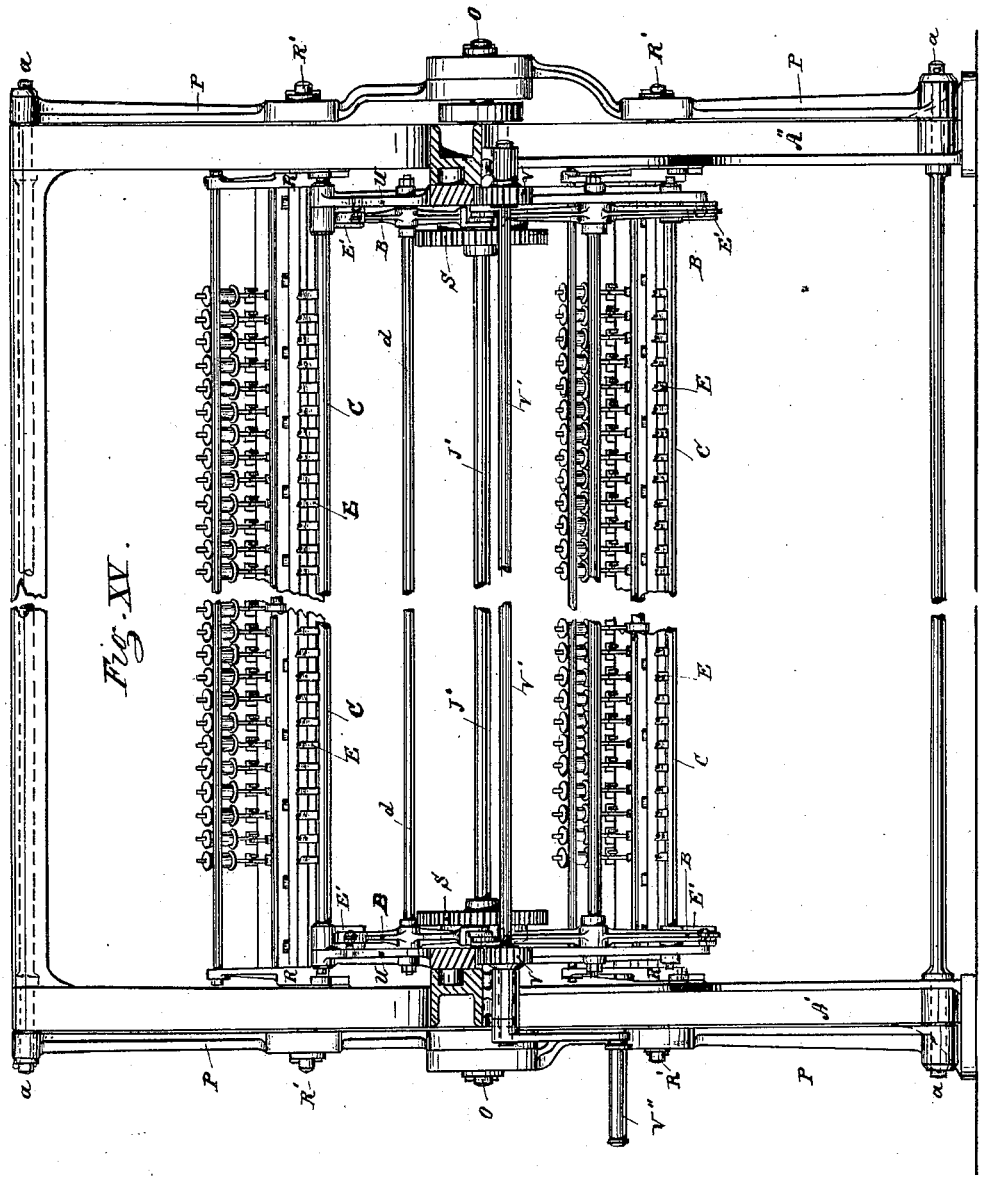

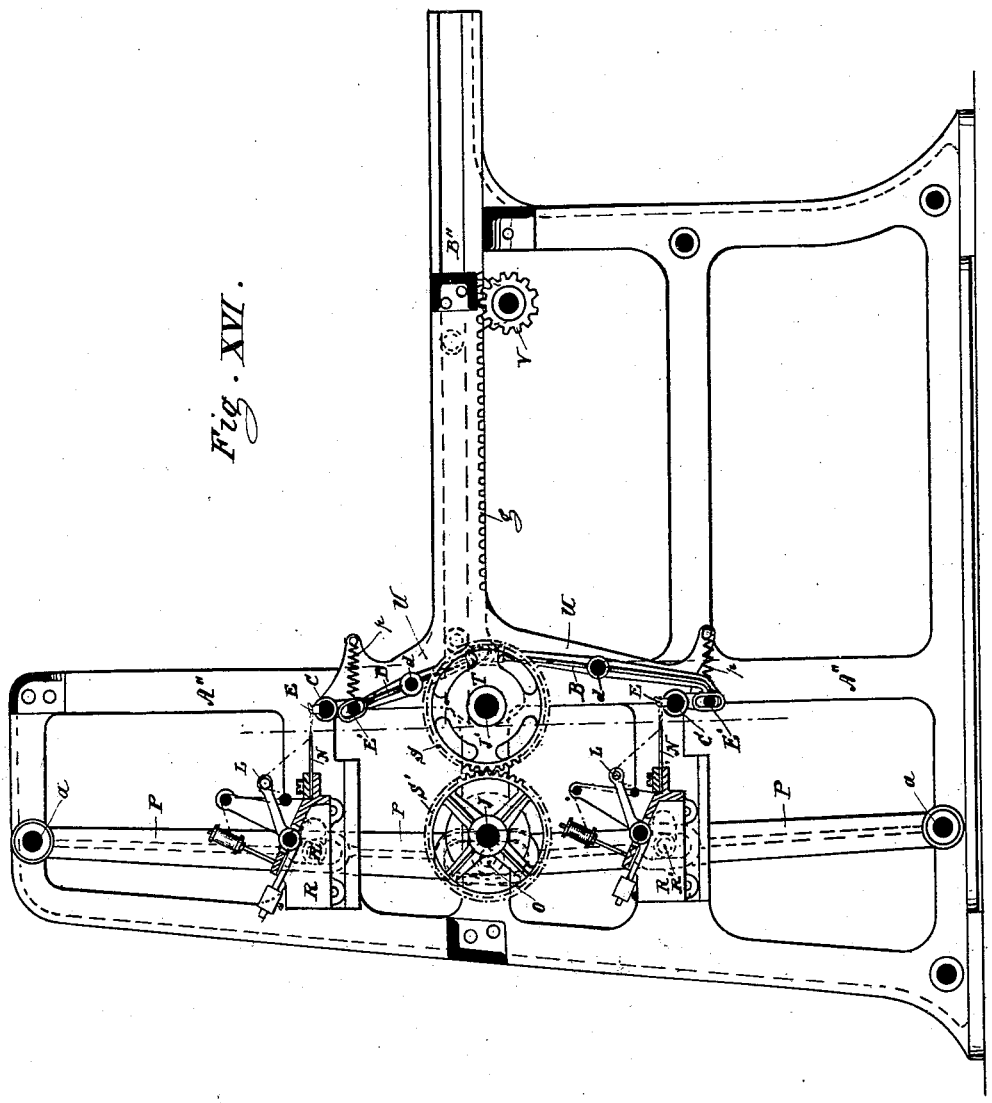

(No Model.) 10 Sheets—Sheet 6.
H. STÖCKEL.
EMBROIDERING MACHINE.
No. 332,846. Patented Dec. 22, 1885.
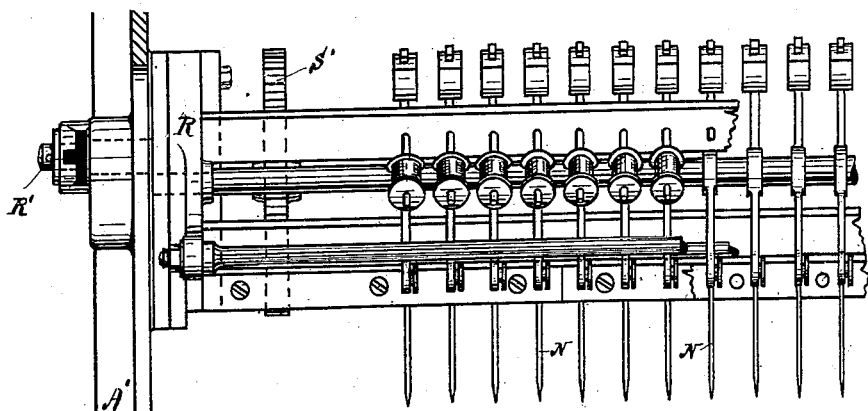
Fig. XVII.
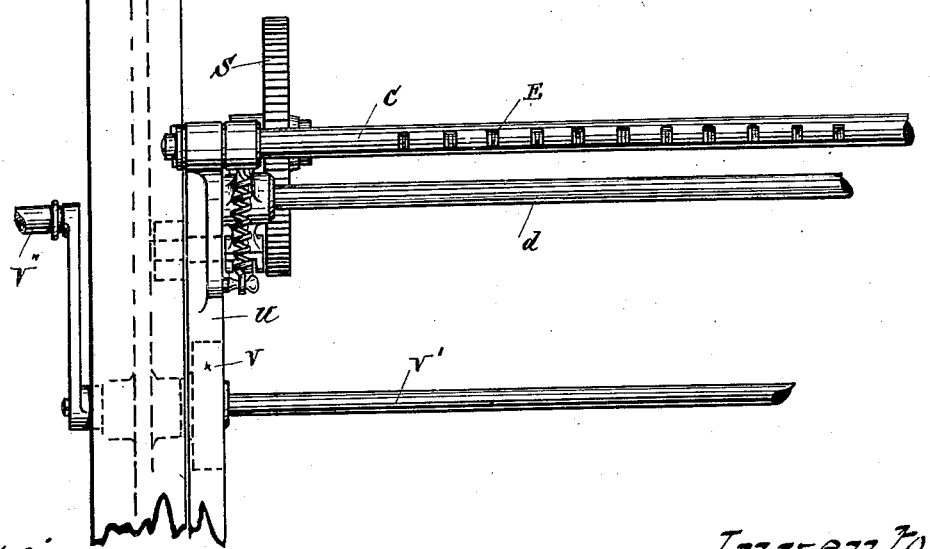
Witnesses. Inventor.

(No Model.) H. STÖCKEL. 10 Sheets—Sheet 7.
EMBROIDERING MACHINE.
No. 332,846. Patented Dec. 22, 1885.
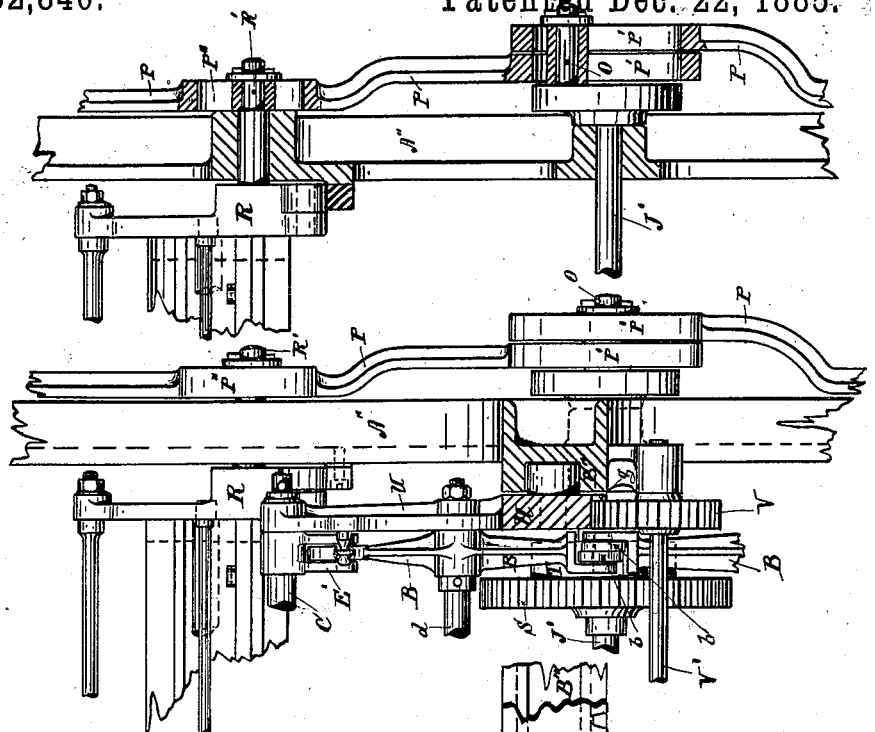
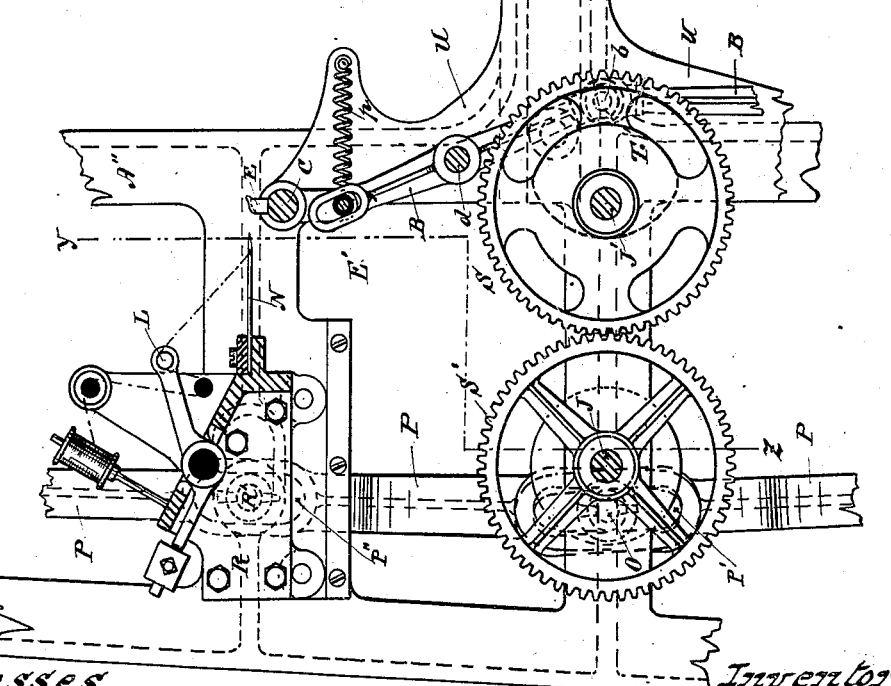
Witnesses. Inventor.

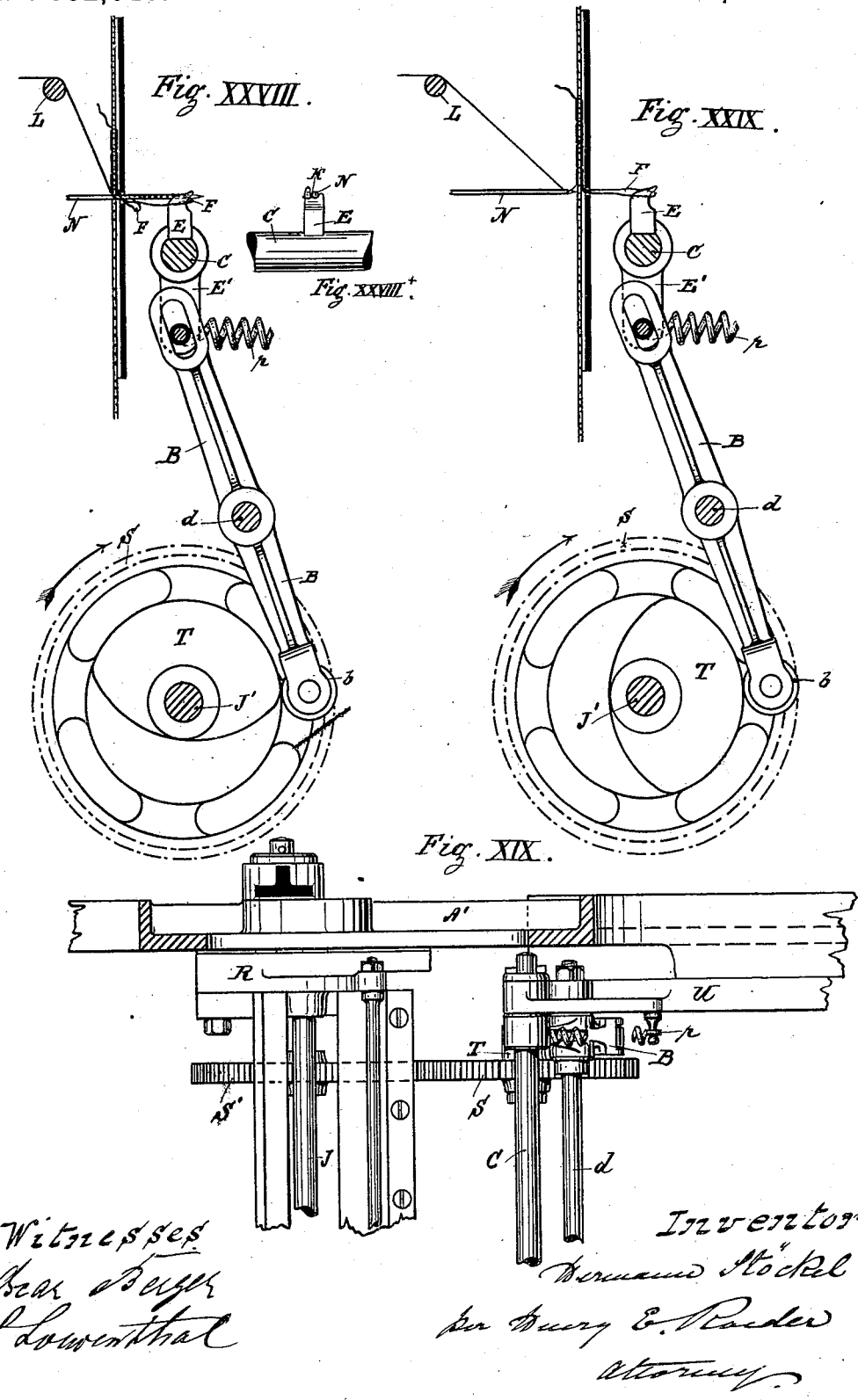

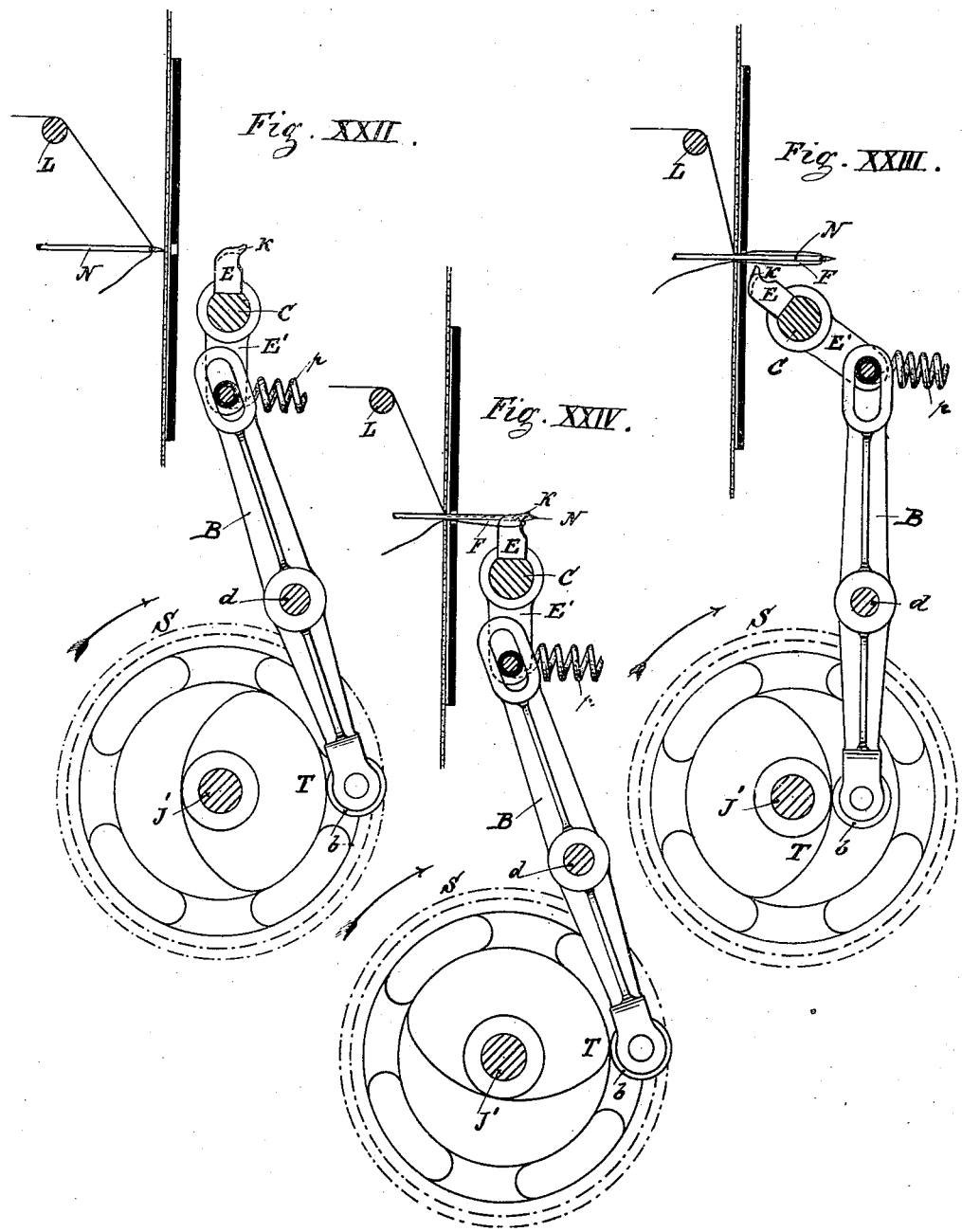

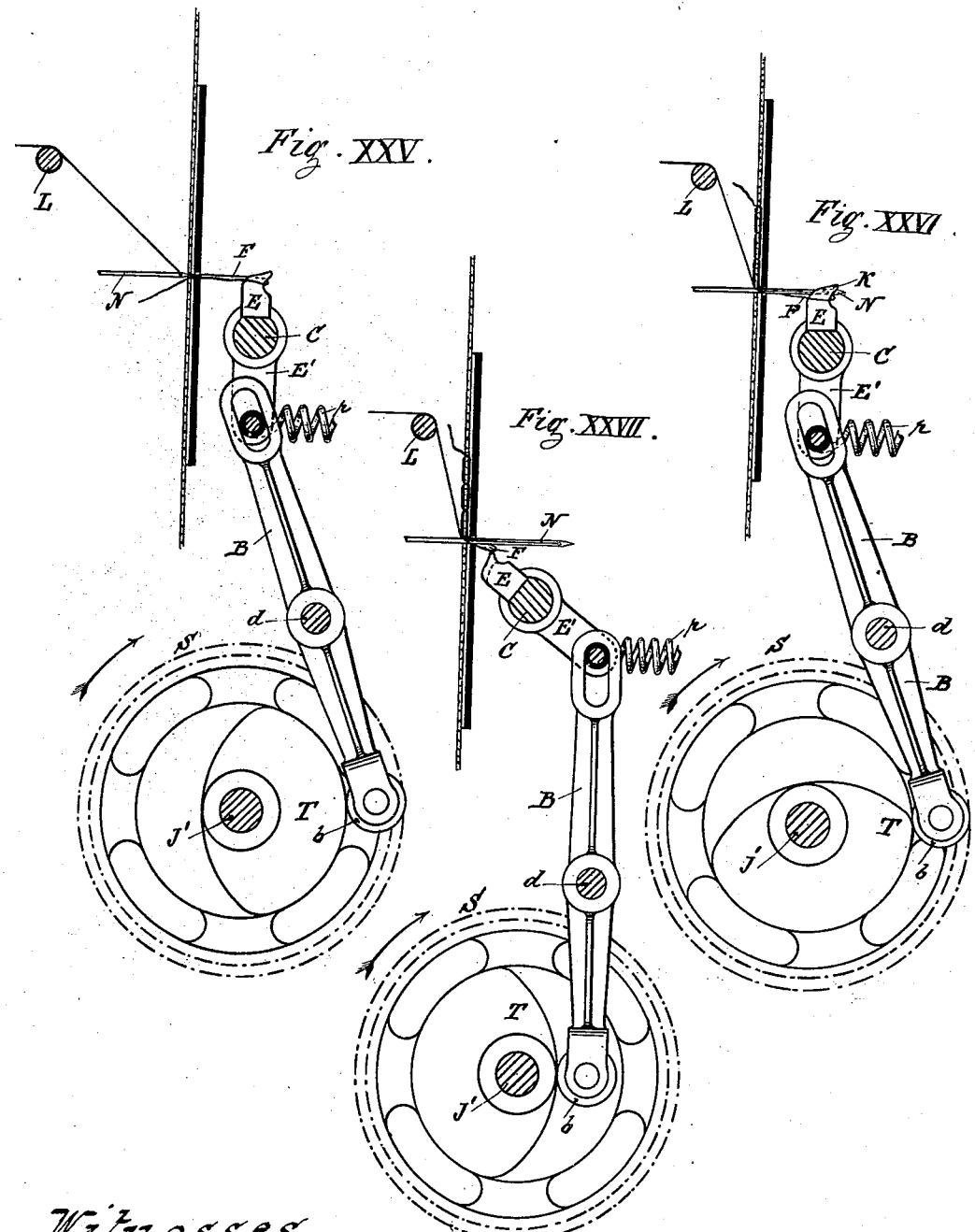

United States Patent Office.

HERRMANN STÖCKEL, OF AUERBACH, GERMANY.

EMBROIDERING-MACHINE.

SPECIFICATION forming part of Letters Patent No. 332,846, dated December 22, 1885.

Application filed November 24, 1884. Serial No. 148,684. (No model.)

*To all whom it may concern:*

Be it known that I, HERRMANN STÖCKEL, a citizen of Germany, residing at Auerbach, in the Empire of Germany, have invented new and useful Improvements in Embroidering-Machines, of which the following is a specification.

The nature of my invention consists in the arrangement of swinging frames with supporting-arms and links operated by a suitable cam in connection with loop-hooks and needles, to produce an intermittent reciprocating motion of the same for the purpose of forming a chain-stitch on the back of the material operated upon.

In the accompanying drawings, Figure XV represents an elevation of an embroidery-machine embodying my invention. Fig. XVI is a side view of the same, and Fig. XVII a plan of part of the machine. The other figures represent various parts in detail, on an enlarged scale, exhibiting the parts in different positions during their operation, and which will be fully explained in the following description.

Similar letters represent similar parts in all the figures.

The invention is in general illustrated in Figs. I to XIV, and Fig. XI represents a side view of the needle and loop-hook arrangement. Fig. XII is a plan of the same. Fig. XIII is a front view; and Fig. XIV is a front view of the needle-and-thread arrangement, taken at line $x\,y$ of Fig. XI. A shaft, $n$, Figs. XI, XII, receives a regular rotary motion, and is provided with crank-pins M, arranged to work in a cam-shaped opening, $h$, in a plate, H, turning loosely on a shaft, D. This shaft D carries a supporting-arm, A, connected through the link B with one end of the loop-hook E, turning freely on a center, C, attached to the plate H. The action of the crank-pin M in the cam-shaped opening $h$ produces a vibratory motion to the plate H, and by means of the supporting-arm A and link B a peculiar motion is given to the loop-hook E, turning on the center C of the plate H, the different positions of which relative with the positions of the needle are shown in Figs. I to XIII. In Fig. I the loop-hook E is in its upper position, and the needle N is just about entering the material. In Fig. II the needle N has penetrated the material, and has moved to the end of its motion, while the action of the crank-pin M, together with the motion of the supporting-arm A and link B, has moved the hook E into its lowest position. In the next position, (shown in Fig. III,) the needle N has been moved partly back, and the hook E has been moved upward, capable of taking hold of the loop F, formed in the needle-thread on account of the back motion of the needle. The further motion of the crank-pin M retains the hook E in the same position, while the needle N has passed out of the material again, leaving the loop F attached upon the hook E, as shown in Fig. IV. On account of the shape of the opening $h$ the further motion of the crank-pin M retains the hook E in that position until the needle N has passed again through the material, and, passing through a suitable recess, K, in the end of the hook E, (see Fig. III$^\times$,) passes through or into the loop F, supported on the hook E, as shown in Fig. V. As soon as the needle has taken hold of the loop F the hook E is moved down toward its lowest position, allowing thereby the loop F to come away from its end, as shown in Fig. VI. The needle N then finishes its outward motion, and this loop F is pulled tight in the usual manner by means of a tension roller or bar, L. The above-described operation is then repeated. The needle during its back motion forms another loop, (see Fig. VI,) which is again taken hold of by the hook E, (similar as shown in Fig. III,) and retained by said hook E until the needle N has passed quite out of the material, during which time the former loop has been drawn tight by the tension-bar L. (See Fig. VIII.) By this continued operation a regular chain-stitch, as shown in Figs. IX and X, will be formed at the back of the material. This loop-hook mechanism occupies but very little space in width, and its parts can easily be placed three-fourths of an inch or less from each other, which by similar machines arranged with bobbins is quite impossible to be attained.

The above-described mechanism explains the general principle of my improved loop-hook arrangement, and is well adapted for small narrow machines with about six (more or less) needles, where the same are arranged as shown in Figs. XI, XII, XIII, and XIV.

In the above-described arrangement every loop-hook is provided and operated by a plate, H, with cam-opening $h$, supporting arm A, and link B, operated through the action of a crank-pin, M, provided on the rotating shaft $n$.

For machines of great width and arranged with two sets of needles, and consequently two sets of loop-hooks, all these loop-hooks can be operated to receive the necessary motion by the arrangement of one single cam or cam-shaped opening in connection with one set of levers and arms arranged at one side of the machine; but for greater certainty and more accurate operation I prefer to arrange this mechanism at each side of the machine. This arrangement is represented in connection with the mechanism for operating the needles in Figs. XV and XVI, and in details in the other figures referred to in the following description.

The needles N, with the tension-bar, bobbins, and tension arrangement, as is usual in similar machines, are arranged in a suitable frame, R, Figs. XV, XVI, and XVIII, supported on rollers to insure the free and easy motion of the same, and moving on suitable ways in the side frames, A' A'', of the machine. It will readily be understood that when the width of the machine is very great one or more supports or ways may be arranged between these side frames. The driving-shaft J, which receives a regular rotary motion by any of the usual means, has at its ends a crank attached, the crank-pin O of which works in suitable slots, P', in the end of levers P, turning or vibrating on fixed centers $a$, arranged in the side frames, A' A''. The levers P are provided with slots P'', into which pins R', attached to the needle-carriage R, (see Fig. XXI,) works, by which arrangement these carriages and needle-frames receive their necessary forward and backward movement. The shaft J carries a gear-wheel, S', meshing into a corresponding gear-wheel, S, attached to a shaft, J'. Upon this shaft J' is a wheel provided with a cam-shaped groove or with a suitable cam, T, (corresponding to the cam-shaped opening $h$ in the plate H, above described,) against the surface of which the rollers $b$, at the end of the levers B, are made to work. The levers B turn on fixed centers $d$, and the other ends of said levers B are connected to the end of levers E', attached to the shaft C, producing thereby a vibratory motion of said shaft C, as will be hereinafter more fully described. The shaft J', the fixed centers $d$, and the shaft C are arranged in suitable frames, U, supported and guided in suitable grooves or ways, B' B'', in the side frames, A' A'', capable of being moved backward in said ways in the side frames, A' A'', in the manner and for the purpose hereinafter described. To the shaft C the loop-hooks E are attached. By this combination of the cam T, levers B, lever E', and shaft C, with the loop-hooks E attached, these loop-hooks E receive the desired necessary motion, (similar as above described and illustrated by Figs. I to VIII,) and which is represented at an enlarged scale in Figs. XXII to XXIX in its various positions. In Fig. XXII the position of the needle N is just ready to pass through the material and the loop hook E is in its upper position. Fig. XXIII shows the hook E moved sidewise toward the material and the needle moved to its greatest extent through the material. In this position the needle remains a short time until the hook E has been moved upward again, when, doing the following partial back motion of the needle N, a loop, F, will be formed, and the then upward motion of the loop-hook E takes hold of this loop F, as shown in Fig. XXIV. The action of the cam T on the lever B retains then the hook E in this upward position, whereby the loop F is retained upon the hook E, while the needle N is moved backward, as shown in Figs. XXV and XXVI. The hook E is then moved back again, so as to let the loop F pass over its end, as shown in Fig. XXVII, when the needle passes again through the material, so that the hook E, which comes then again into an upright position, takes hold of a new loop, as shown in Fig. XXVIII. During the time the loop F is held fast on the hook E the take-up bar L acts in such a manner as to tighten the previous let-loose loop, as shown in Figs. XXIX. The loop-hooks E are provided in their upper ends with recesses K, (see Figs. XXVIII$^\times$,) similar as described above, and shown in Fig. III$^\times$.

To insure the close contact of the roller $b$ against the face of the cam T, (in case a cam is used,) a spring, $p$, is attached to the end of the lever E', (see Figs. XVI and XVIII,) the other end of which is attached to the frame U. If, in place of the cam T, a cam-shaped groove is arranged in which the rollers $b$ of the levers B work, this spring $p$ may be dispensed with.

As above stated, the shaft J', the fixed centers $d$, and the shaft C, carrying the hooks E— in fact, the whole mechanism for operating these loop-hooks E—are attached to frames U. These frames are fitted to move in suitable grooves, B' B'', made in elongations of the side frames, A' A'', and are provided with suitable racks, $g$, on the under side, into which pinions V, attached to a shaft, V', and supported in the side frames, A' A'', is made to work. This shaft V', and consequently the pinions V, are operated by a crank, V''. (See Figs. XVII and XV.) By this arrangement the frames U, as well as the whole mechanism of the loop-hooks, can be moved backward away from the material for the purpose of removing the material and replacing the same again. A suitable arrangement must be made to keep and retain this frame U and the loop-hook mechanism in their proper and exact position when moved up again toward the material and in position for operation.

What I claim as my invention, and desire to secure by Letters Patent, is—

1. The combination of a swinging frame, H, with cam-shaped opening $h$, turning freely on a shaft, D, supporting-arm A, link B, loop-hook E, turning on a center, C, on the plate H, and crank-pin M in a rotary shaft, $n$, arranged to operate in combination with the needle N, and the suitable thread with its tension and take-up mechanism of an embroidering-machine, in the manner and for the purpose substantially as described.

2. The combination of the shaft J, crank-pin O, vibrating levers P, with slot P″, pin R′, working in said slot P″, with the carriage R, supporting the needles N, and their appendent parts, arranged to operate in combination with the loop-hooks E in the manner and for the purpose substantially as set forth.

In testimony whereof I have signed my name to this specification in the presence of two subscribing witnesses.

HERRMANN STÖCKEL.

Witnesses:
 EDMUND BACH,
 HERMANN PEISSKER.